United States Patent
Pan et al.

(10) Patent No.: US 11,615,090 B2
(45) Date of Patent: Mar. 28, 2023

(54) METHOD, APPARATUS AND SYSTEM FOR DETERMINING ACCESSIBLE PATHS BETWEEN TWO NODES

(71) Applicant: NEC CORPORATION, Tokyo (JP)

(72) Inventors: Zheng Pan, Beijing (CN); Wenjuan Wei, Beijing (CN); Chunchen Liu, Beijing (CN)

(73) Assignee: NEC CORPORATION, Tokyo (JP)

( * ) Notice: Subject to any disclaimer, the term of this patent is extended or adjusted under 35 U.S.C. 154(b) by 206 days.

(21) Appl. No.: 17/043,366

(22) PCT Filed: Mar. 29, 2019

(86) PCT No.: PCT/CN2019/080608
§ 371 (c)(1),
(2) Date: Sep. 29, 2020

(87) PCT Pub. No.: WO2019/185052
PCT Pub. Date: Oct. 3, 2019

(65) Prior Publication Data
US 2021/0097079 A1    Apr. 1, 2021

(30) Foreign Application Priority Data
Mar. 30, 2018    (CN) .......................... 201810276329.9

(51) Int. Cl.
*G06F 16/00*    (2019.01)
*G06F 16/2453*    (2019.01)
(Continued)

(52) U.S. Cl.
CPC .... *G06F 16/24542* (2019.01); *G06F 16/2465* (2019.01); *G06F 16/9024* (2019.01); *G06F 2216/03* (2013.01)

(58) Field of Classification Search
CPC ........... G06F 16/24542; G06F 16/9024; G06F 2216/03; G06F 16/2465
See application file for complete search history.

(56) References Cited

U.S. PATENT DOCUMENTS

| 5,577,030 | A | 11/1996 | Oki et al. | |
| 9,558,265 | B1* | 1/2017 | Tacchi | G06F 16/338 |
| 9,710,544 | B1* | 7/2017 | Smith | G06F 16/36 |
| 9,787,705 | B1* | 10/2017 | Love | G06F 16/9024 |

(Continued)

FOREIGN PATENT DOCUMENTS

| CN | 101944095 B | * | 9/2012 |
| CN | 103855707 A | * | 6/2014 |

(Continued)

OTHER PUBLICATIONS

International search report for PCT/CN2019/080608 dated Jul. 15, 2019.

(Continued)

*Primary Examiner* — Leslie Wong
(74) *Attorney, Agent, or Firm* — Sughrue Mion, PLLC

(57) ABSTRACT

The present disclosure relates to a method, apparatus and system for determining accessible paths between two nodes. According to the method of the present disclosure, an adjacency matrix of a graph, which includes a plurality of points and edges connecting the plurality of points, is first established; then, search is made for an accessible path that can reach a destination from a starting point based on the adjacency matrix. Especially, a termination condition for the searching is set based on an already-sought path during the searching, and the corresponding search is terminated in response to the termination condition being met during the searching. With the present disclosure, it may substantially reduce repeated traversal, obvious reduce the time taken to search for accessible paths between two nodes, and signifi- (Continued)

cantly improve the efficiency in searching for the accessible path.

14 Claims, 7 Drawing Sheets

(51) Int. Cl.
  *G06F 16/2458* (2019.01)
  *G06F 16/901* (2019.01)

(56) References Cited

U.S. PATENT DOCUMENTS

| | | | |
|---|---|---|---|
| 9,911,211 B1* | 3/2018 | Damaraju | G06F 16/9024 |
| 2003/0023388 A1* | 1/2003 | Wagner | G16B 5/00 |
| | | | 708/131 |
| 2004/0204905 A1* | 10/2004 | Huelsbergen | G06F 17/10 |
| | | | 702/179 |
| 2010/0049431 A1* | 2/2010 | Zetune | G01C 21/206 |
| | | | 382/106 |
| 2013/0246439 A1* | 9/2013 | Liekens | G06F 16/9024 |
| | | | 707/748 |
| 2014/0126423 A1* | 5/2014 | Vasseur | H04L 45/48 |
| | | | 370/255 |
| 2017/0228435 A1* | 8/2017 | Tacchi | G06N 20/00 |
| 2018/0144458 A1* | 5/2018 | Xu | G06V 10/44 |
| 2019/0087067 A1* | 3/2019 | Hovden | G06F 3/04815 |
| 2019/0205746 A1* | 7/2019 | Nurvitadhi | G06K 9/6256 |
| 2019/0286504 A1* | 9/2019 | Muntés-Mulero | |
| | | | G06F 11/0709 |
| 2022/0006726 A1* | 1/2022 | Michael | H04L 45/123 |

FOREIGN PATENT DOCUMENTS

| | | | | |
|---|---|---|---|---|
| CN | 103995954 A | * | 8/2014 | |
| CN | 104266656 A | | 1/2015 | |
| CN | 105547308 A | | 5/2016 | |
| CN | 105547316 A | | 5/2016 | |
| CN | 106441338 A | | 2/2017 | |
| CN | 106840188 A | | 6/2017 | |
| CN | 107121146 A | | 9/2017 | |
| CN | 107276896 A | * | 10/2017 | H04L 45/12 |
| CN | 107276896 A | | 10/2017 | |
| CN | 107404437 A | | 11/2017 | |
| EP | 2662778 A1 | * | 11/2013 | H04L 45/02 |
| JP | H08-293880 A | | 11/1996 | |
| JP | 2001-125882 A | | 5/2001 | |
| JP | 2011-249885 A | | 12/2011 | |
| JP | 2012142905 A | * | 7/2012 | |
| KR | 10-2009-0083198 A | | 8/2009 | |
| KR | 10-2010-0056068 A | | 5/2010 | |
| WO | 2016/129078 A1 | | 8/2016 | |

OTHER PUBLICATIONS

Written opinion for PCT/CN2019/080608 dated Jul. 15, 2019.
Office Action dated Jan. 4, 2022 in Japanese Application No. 2020-552259.
Office Action dated Nov. 14, 2022 issued by the Chinese Patent Office in Chinese Application No. 201810276329.9.
"Shortest path algorithm based on adjacency matrix", Software Guide, 2010, vol. 9, No. 9 (3 pages total).

* cited by examiner

|   | 1 | 2 | 3 | 4 | 5 | 6 | 7 |
|---|---|---|---|---|---|---|---|
| 1 | 0 | 1 | 1 | 0 | 0 | 0 | 0 |
| 2 | 0 | 0 | 0 | 0 | 1 | 1 | 0 |
| 3 | 0 | 1 | 0 | 1 | 0 | 0 | 0 |
| 4 | 0 | 0 | 0 | 0 | 0 | 0 | 0 |
| 5 | 0 | 0 | 0 | 1 | 0 | 0 | 0 |
| 6 | 0 | 0 | 0 | 0 | 0 | 0 | 1 |
| 7 | 0 | 0 | 0 | 0 | 1 | 0 | 0 |

$$P = \begin{bmatrix} 0 & 1 & 1 & 0 & 0 & 0 & 0 \\ 0 & 0 & 0 & 0 & 1 & 1 & 0 \\ 0 & 1 & 0 & 1 & 0 & 0 & 0 \\ 0 & 0 & 0 & 0 & 0 & 0 & 0 \\ 0 & 0 & 0 & 1 & 0 & 0 & 0 \\ 0 & 0 & 0 & 0 & 0 & 0 & 1 \\ 0 & 0 & 0 & 0 & 1 & 0 & 0 \end{bmatrix}$$

Fig.3A $$A = P + P^2 + P^3 + P^4 + P^5 + P^6 = \begin{bmatrix} 0 & 2 & 1 & 5 & 4 & 2 & 2 \\ 0 & 0 & 0 & 2 & 2 & 1 & 1 \\ 0 & 1 & 0 & 3 & 2 & 1 & 1 \\ 0 & 0 & 0 & 0 & 0 & 0 & 0 \\ 0 & 0 & 0 & 1 & 0 & 0 & 0 \\ 0 & 0 & 0 & 1 & 1 & 0 & 1 \\ 0 & 0 & 0 & 1 & 1 & 0 & 0 \end{bmatrix}$$

Fig.3B

|   | 1 | 2 | 3 | 4 | 5 | 6 | 7 |
|---|---|---|---|---|---|---|---|
| 1 | 0 | 1 | 1 | 0 | 0 | 0 | 0 |
| 2 | 0 | 0 | 0 | 0 | 1 | 1 | 0 |
| 3 | 0 | 1 | 0 | 1 | 0 | 0 | 0 |
| 4 | 0 | 0 | 0 | 0 | 0 | 0 | 0 |
| 5 | 0 | 0 | 0 | 1 | 0 | 0 | 0 |
| 6 | 0 | 0 | 0 | 0 | 0 | 0 | 1 |
| 7 | 0 | 0 | 0 | 0 | 1 | 0 | 0 |

|   | 1 | 2 | 3 | 6 | 7 |
|---|---|---|---|---|---|
| 1 | 0 | 1 | 1 | 0 | 0 |
| 2 | 0 | 0 | 0 | 1 | 0 |
| 3 | 0 | 1 | 0 | 0 | 0 |
| 6 | 0 | 0 | 0 | 0 | 1 |
| 7 | 0 | 0 | 0 | 0 | 0 |

Path1  1→1 2 →1 2 5 →1 2 5 4          ×
Path2  1→1 2 →1 2 6 →1 2 6 7          √
Path3  1→1 3 →1 3 2 →1 3 2 5 →1 3 2 5 4 ×
Path4  1→1 3 →1 3 2 →1 3 2 6 →1 3 2 6 7 √
Path5  1→1 3 →1 3 4                    ×

Path1  1→1 2 →1 2 6 →1 2 6 7     √
Path2  1→1 3 →1 3 2 →1 3 2 6 7   √

METHOD, APPARATUS AND SYSTEM FOR DETERMINING ACCESSIBLE PATHS BETWEEN TWO NODES

CROSS-REFERENCE TO RELATED APPLICATIONS

This application is a National Stage of International Application No. PCT/CN2019/080608 filed on Mar. 29, 2019, which claims priority under U.S.C. § 119(a) to Chinese Patent Application No. 201810276329.9 filed on Mar. 30, 2018.

FIELD

The present disclosure relates to the technology field of data mining, and more particularly to a method, apparatus and system for determining accessible paths between two nodes.

BACKGROUND

In the big data era, a large amount of data may be obtained by various data acquisition means. A lot of useful information may be obtained by performing data analysis and mining for these data. In real life, many application scenarios may be represented by a network structure. For example, in a complex road network, a dot may be used to represent a crossing, and a line may be used to represent a road section between two crossings, so that many dots and lines may be used to form a traffic network structure diagram. Similarly, people and social relationships in a social network may also be represented by a network structure diagram.

In the current existing technologies, there is a lot of research focusing on the search and determination of a minimum path between two nodes, whereas currently there is little research focusing on solutions for search and determination of all accessible paths between two nodes. However, such information has actual needs and uses in reality. For example, as for a traffic network, there might be demands for determining all possible paths starting from a starting node to a destination; as for a social network, there also might be demands for finding all possible association relationships between two persons.

As for a network structure including a large number of nodes and edges, it is inefficient and time-consuming to use known technique to search for all accessible paths between two nodes, which cannot satisfy the needs of applications. Hence, in the prior art there is a demand for implementing the search for accessible paths between two nodes with a more efficient solution.

SUMMARY

In view of this, the present disclosure presents a method, apparatus and system for determining accessible paths between two nodes to at least partially eliminate or alleviate the problems in the art.

According to a first aspect of the present disclosure, there is provided a method for determining accessible paths between two nodes. In the method is first established an adjacency matrix of a graph including a plurality of points and edges connecting the plurality of points, then, search is performed for an accessible path that can reach a destination from a starting point based on the adjacency matrix. Especially, a termination condition for the searching is set based on an already-sought path during the searching, and the corresponding search is terminated in response to the termination condition being met during the searching.

According to a second aspect of the present disclosure, there is provided an apparatus for determining accessible paths between two nodes. The apparatus may comprise: an adjacency matrix establishment module, a path search module, a condition setting module and a search termination module. The adjacency matrix establishment module may be configured to establish an adjacency matrix of a graph including a plurality of points and edges connecting the plurality of points. The path search module may be configured to search for an accessible path that can reach a destination from a starting point based on the adjacency matrix. The condition setting module may be configured to set a termination condition for the searching based on an already-sought path during the searching. The search termination module may be configured to terminate a corresponding search in response to the termination condition being met during the searching.

According to a third aspect of the present disclosure, there is provided a system for determining accessible paths between two nodes. The system can comprise: a processor; and a memory having one or more computer program codes stored thereon, the computer program codes, when executed by the processor, causing the processor to perform steps of the method according to the first aspect of the present disclosure.

According to a fourth aspect of the present disclosure, there is provided a computer-readable storage medium having computer program codes stored thereon, the computer program codes, when executed by a processor, causing the processor to perform steps of the method according to the first aspect of the present disclosure.

According to a fifth aspect of the present disclosure, there is provided computer program product having computer program codes stored thereon, the computer program codes, when loaded into a computer device, causing the computing device to perform steps of the method according to the first aspect of the present disclosure.

With embodiments of the present disclosure, repeated traversals may be substantially reduced by setting the termination condition for the searching by monitoring already-sought paths. In addition, in a preferred implementation, the pruning operation may also be performed before staring the search. As such, it is possible to further reduce the time taken to search for accessible paths between two nodes, and significantly improve the efficiency in searching for the accessible path.

BRIEF DESCRIPTION OF THE DRAWINGS

Through the following detailed description of illustrated embodiments with reference to the accompanying drawings, the above and other features of the present disclosure will become more apparent. Same reference signs in the drawings of the present disclosure represent same or similar elements. In the drawings:

FIG. 3A and FIG. 3B schematically illustrate a schematic diagram of a matrix P representing an adjacency matrix and an accessible matrix according to an embodiment of the present disclosure;

DETAILED DESCRIPTION OF EMBODIMENTS

Figure 1:
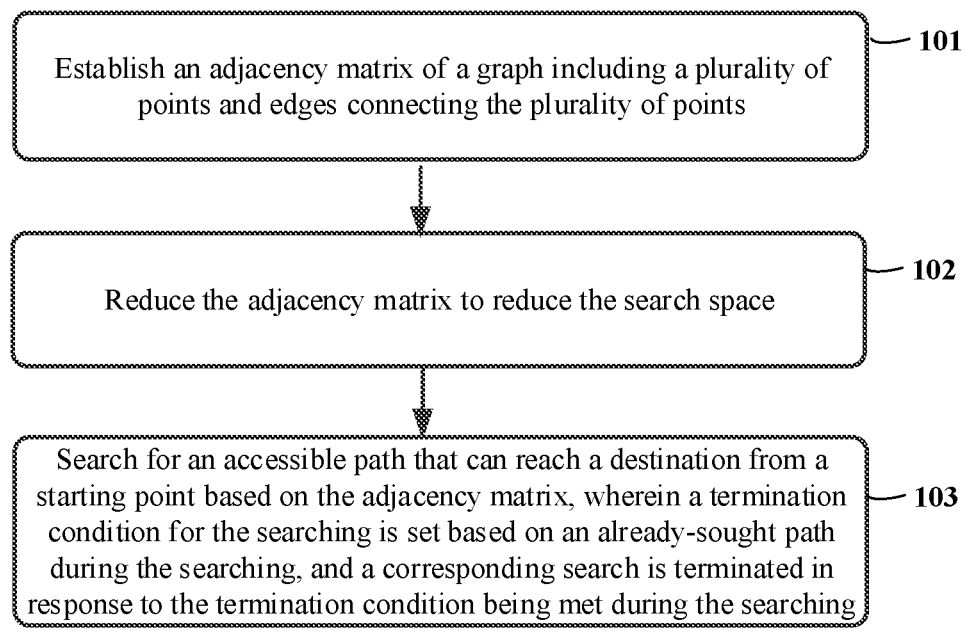
FIG. 1 schematically illustrates a flowchart of a method for determining accessible paths between two nodes according to an embodiment of the present disclosure.

Hereinafter, various example embodiments of the present disclosure will be described in details with reference to the drawings. It should be noted that these drawings and description only relate to preferred embodiments which act as examples. It should be noted that alternative embodiments of structures and methods disclosed herein can be easily contemplated based on the following description and these alternative embodiments can be utilized without deviating from the principles protected by the present disclosure.

It should be understood that these example embodiments are described merely to enable those skilled in the art to better understand and further implement the present disclosure and not intended for limiting the scope of the present disclosure in any manner. Besides, in the drawings, optional steps, modules and the like will be illustrated in dashed boxes for the purpose of explanation.

As used herein, the terms "comprise(s)/comprising," "include(s)/including" and the like are to be read as open-ended terms that mean "comprise(s)/include(s), but not limited to." The term "based on" is to be read as "based at least in part on." The term "one example embodiment" is to be read as "at least one example embodiment." The term "a further embodiment" is to be read as "at least one further embodiment." Related definitions of other terms will be provided in the following description.

As described above, as for a network structure including a large number of nodes and edges, it is inefficient and time-consuming to use known technique to search for all accessible paths between two nodes, which cannot satisfy the needs of applications. In the text hereunder, solutions for searching for accessible paths between two nodes in the prior art are briefly described for an illustration purpose.

The Chinese patent application published as CN105547308 proposes a navigation method based on a digital road network map and a deep-first traversal. According to the method, first, a digital road network map is built, and then a navigation path from a departure node to a destination is planned using the deep-first traversal based on the digital road network map. Specifically, according to the technical solution proposed in the patent publication, a directed graph is first built, and an adjacency matrix of the graph is established. Then, for a vertex, its adjacent node, namely, a node accessible from the vertex, is sought for. Once its adjacent node is found, search for an adjacent node is continued for the newly-found adjacent node, unless the newly-found adjacent node is a destination node, or no adjacent nodes are found, whereupon the flow will return to search for an upper-level nodes (if any). Regarding performing search for adjacent node with regard for the newly-found adjacent node, the newly-found adjacent node is taken as a new vertex to continue to search for an adjacent node of the new vertex. The search process lasts in a depth direction until a destination is reached, and thereafter returns the search path, and searches for a new adjacent node of the vertex or return to an upper-level node search cycle to continue the search if failing to find the new adjacent node.

Hence, in the solution for searching for accessible paths between two nodes in the prior art, the whole network structure needs to be traversed many times. When there are a number of nodes and edges in the network, the situation will be further deteriorated. Hence, this will cause low search efficiency and fail to satisfy the needs of application.

To this end, in embodiments of the present disclosure, there is provided a method, apparatus and system for determining accessible paths between two nodes to at least partially ease the above problems. According to the embodiments of the present disclosure, there is proposed a solution for determining accessible paths between two nodes. According to the solution, accessible paths already sought may be recorded in the search process, and a termination condition for the searching may be set based on this, to reduce repeated traversal. In addition, the original network structure may be pruned to reduce the search space. In this way, the search workload is substantially reduced, and the search efficiency is significantly improved, thereby satisfying the needs of actual applications. The solution of the present disclosure may be widely applied to various fields such as road network search, power grid node search, social network search, and causal network search.

Hereunder, reference will be made to FIG. 1 through FIG. 8 to describe a method, apparatus and system for determining accessible paths between two nodes according to the present disclosure. However, it is to be appreciated that these depictions are only for illustrative purpose, and the present disclosure is not limited to these implementations and details in the figures.

FIG. 1 schematically illustrates a flowchart of a method for determining accessible paths between two nodes according to an embodiment of the present disclosure. As shown in FIG. 1, first in step 101 is built an adjacency matrix of a graph including a plurality of nodes and edges connecting the plurality of nodes.

As stated above, in real life, many application scenarios may be represented by a network structure. For example, in a complex road network, a dot may be used to represent a crossing, and a line may be used to represent a road section between two crossings, so that many dots and lines may be used to form a traffic network structure diagram. Similarly, people and social relationships in a social network may also be represented by a network structure diagram. In this way, a graph including a plurality of nodes and edges connecting the plurality of nodes may be formed for a specific application.

Regarding such a graph, an adjacency matrix of the graph may be built according to a connection relationship between nodes and edges. Usually, the adjacency matrix is an N×N matrix, where N is equal to the number of nodes in the graph.

For the $i^{th}$ row and $j^{th}$ column in the adjacency matrix, a corresponding value represents a weight from node i to node j, which indicates whether there is a direct path from node i to node j. If there is a direct path from node i to node j, the weight is a value greater than 0; if there is no direct path from node i to node j, the weight should be 0. In the present disclosure, for the convenience of description, the weight will be directly set to 1 for the case where there is a direct path from node i to node j. However, it needs to be appreciated that in practical applications, the weight may also be set to other appropriate non-zero values by considering other factors.

Figures 2A, 2B:
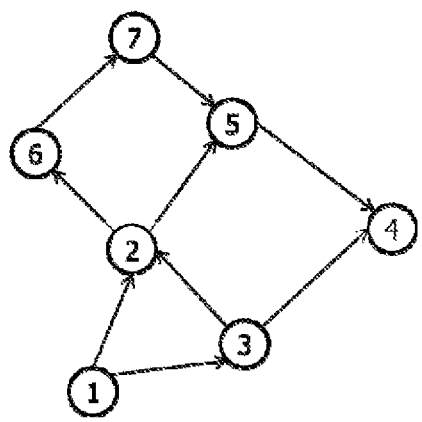
FIG. 2A and FIG. 2B schematically illustrate a schematic diagram of an example network structure and a corresponding adjacency matrix according to an embodiment of the present disclosure.

For the illustrative purpose, FIG. 2A and FIG. 2B schematically illustrate a schematic diagram of an example network structure and a corresponding adjacency matrix according to an embodiment of the present disclosure.

As shown in FIG. 2A, a network with 7 nodes is shown, where there is a direct path from node 1 to node 2 and node 3; there is a direct path from node 2 to node 5 and 6; there is a direct path from node 3 to node 2 and node 4; there is a direct path from node 5 to node 4; there is a direct path from node 6 to node 7, and there is a direct path from node 7 to node 5.

Correspondingly, in the above manner, for the graph structure of FIG. 2A, in the case where there is a direct path from node i to node j, the weight is directly set to 1, and in the case where there is no direct path from node i to node j, the weight is directly set to 0. In this way, the adjacency matrix shown in FIG. 2B may be obtained.

As shown in FIG. 2B, for example, for the first row of the adjacency matrix, for node 1, since node 1 is alone, there is no side, so the corresponding weight is set to 0; for node 2 and node 3, since there is a direct path from node 1 to node 2 and node 3, the corresponding weight is set to 1. For nodes 4, 5, 6 and 7, there are no direct paths from node 1 to these nodes in the graph as shown in FIG. 2A, so its corresponding weight is set to 0. As such, for the first row, [0110000] may be obtained. Similarly, [0000110], [0101000], [0000000], [0001000], [0000001] and [0000100] may be obtained for the second row, the third row, the fourth row, the fifth row, the sixth row and the seventh row, respectively. In this way, the adjacency matrix of the graph for a specific application may be determined.

Next, referring back to FIG. 1, in step 102, search is performed for accessible paths from the starting node to the ending node based on the adjacency matrix. Especially, in the search process, the termination condition for the searching is set based on the searched path, and wherein the corresponding search is terminated in response to the termination condition being met during the searching.

Therefore, unlike the prior art in which the destination is taken as the termination condition to terminate the search, in the present disclosure monitoring is performed for the searching process, the accessible paths already sought in the search process are recorded, and the termination condition for the searching is set based on this to reduce repeated traversal. Specifically, in the present disclosure, in addition to taking the destination as the termination condition of one search as in the prior art, a certain node is taken as one of the termination conditions when all paths from the certain node to the destination have already been traversed with respect to the certain node. It may be appreciated that when all paths from the certain node to the destination have already been traversed with respect to the certain node, and the search process and results will be the same if the next search reaches the node, that is to say, repeated traversal will be performed. With the node being set as the termination condition, when a search reaches the node again, repeated search after the node may be omitted, and the previous traversal result may be directly re-used. Furthermore, as the search process progresses, the termination condition will continue to be updated. In this way, repeated traversal operations may be reduced, the search efficiency may be improved, and the time taken to search for accessible paths may be reduced as well.

Correspondingly, in the search process, when the termination condition is judged, judgment of a node other than the destination as the terminal condition may be added. In the case where a node for which an adjacent node will be sought is the destination, the corresponding search may be terminated, and the previous search result corresponding to the node may be taken as a search result for the node. On the other hand, if a node for which an adjacent node will be sought is not the destination, a subsequent search will be terminated, and the previous search result corresponding to the node may be taken as a search result for the node. In this way, the search workload may be greatly reduced, and the search efficiency may be significantly improved.

In addition, in order to further improve the search efficiency, it is optionally proposed in the present disclosure to first reduce the adjacency matrix before searching to reduce the search space, as shown in step 103 in FIG. 1. For example, nodes that cannot reach the destination may be removed from the adjacency matrix by a pruning operation.

There are various methods for pruning. However, in an embodiment of the present disclosure, an accessible matrix of the graph may be determined according to the adjacency matrix, and then the adjacency matrix may be reduced according to the accessible matrix and the determined destination. For example, more specifically, the adjacency matrix may be represented with the matrix P, and then the 2-order to N−1-order adjacency matrixes of the matrix P will be calculated, wherein N is the number of nodes in the graph. Then, the accessible matrix of the graph may be determined by adding up the matrix P and the 2-order to N−1-order adjacency matrixes. Then, nodes therein that cannot reach the destination may be determined according to the accessible matrix, and the nodes that cannot reach the destination may be removed from the adjacency matrix, thereby reducing the adjacency matrix and reducing the search space.

For the purpose of illustration, the pruning process will be described below with reference to FIG. 3A through FIG. 4. However, it should be noted that this is only for illustrative purposes, and other appropriate pruning algorithms may also be used in the present disclosure.

FIG. 3A shows the matrix P corresponding to the adjacency matrix in FIG. 2B, which represents the adjacency matrix of FIG. 2B in a mathematical matrix form. Then, the accessible matrix A may be calculated based on the matrix P. The accessible matrix A for example may be expressed by the following Equation:

$$A = P + P^2 + P^3 + P^4 + P^5 + P^6 \qquad \text{(Equation 1)}$$

where $P^k$ represents the K-order matrix of P, and K=1, 2, . . . N−1. The K-order matrix of P represents the multiplication of the number K of Ps. For the matrix P in FIG. 3A, FIG. 3B shows the accessible matrix A calculated according to the above equation.

In the accessible matrix A, a value corresponding to $A_{ij}$ indicates whether node can reach node j. If $A_{ij}=0$, this indicates that node i cannot reach node j; otherwise this indicates that node i can reach node j. In the case of searching for accessible paths from node 1 to node 7, it can be seen from the accessible matrix A shown in FIG. 3B, both $A_{47}$ and $A_{57}$ are 0, which means that node 4 and node 5 cannot reach the destination 7. Based on the information obtained in the accessible matrix, it may prune the adjacency matrix and remove nodes 4 and 5 from the adjacency matrix.

Figure 4A:
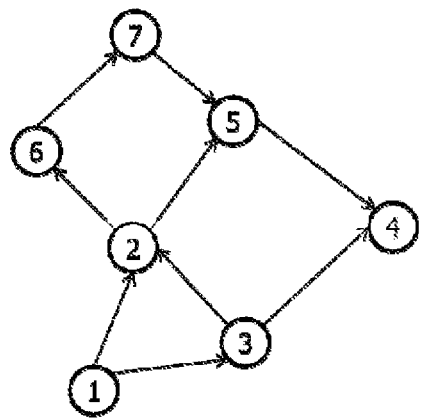
FIG. 4A and FIG. 4B respectively schematically illustrate a schematic diagram of a network structure and an adjacency matrix before pruning and a schematic diagram of a network structure after pruning and an adjacency matrix.
Figure 4B:
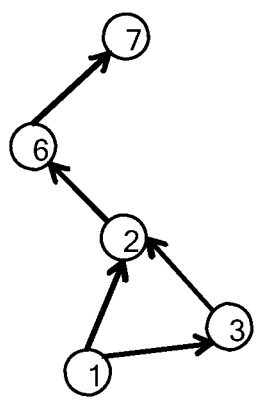

FIG. 4A and FIG. 4B respectively schematically illustrate a schematic diagram of a network structure and an adjacency matrix before pruning and a schematic diagram of a network structure and an adjacency matrix after pruning. FIG. 4A illustrates an entire network structure including seven nodes and a corresponding adjacency matrix before pruning. After it is determined according to the accessible matrix of FIG. 3B that the node 4 and node 5 cannot access node 7, the network structure and adjacency matrix are pruned. Regarding the network structure, node 4 and node 5 are taken out of the network structure. As such, the network structure after the pruning no longer includes node 4 and node 5. Regarding the adjacency matrix, the 4th-5th lines and the 4th-5th columns corresponding to node 4 and node 5 will be removed from the adjacency matrix, so that the adjacency matrix after the pruning or reduction no longer includes the rows and columns related to the node 4 and node 5, as shown in FIG. 4B.

As such, the subsequent search process may be performed based on the reduced adjacent matrix. Hence, as compared with the case without pruning, the search space is significantly reduced, so that the search amount may be further reduced.

In order to enable those skilled in the art to understand the solution proposed in the present disclosure deeper, reference will be made hereunder to FIG. 5 to describe a specific example implementation for determining accessible paths between two nodes according to an embodiment of the present disclosure.

Figure 5:
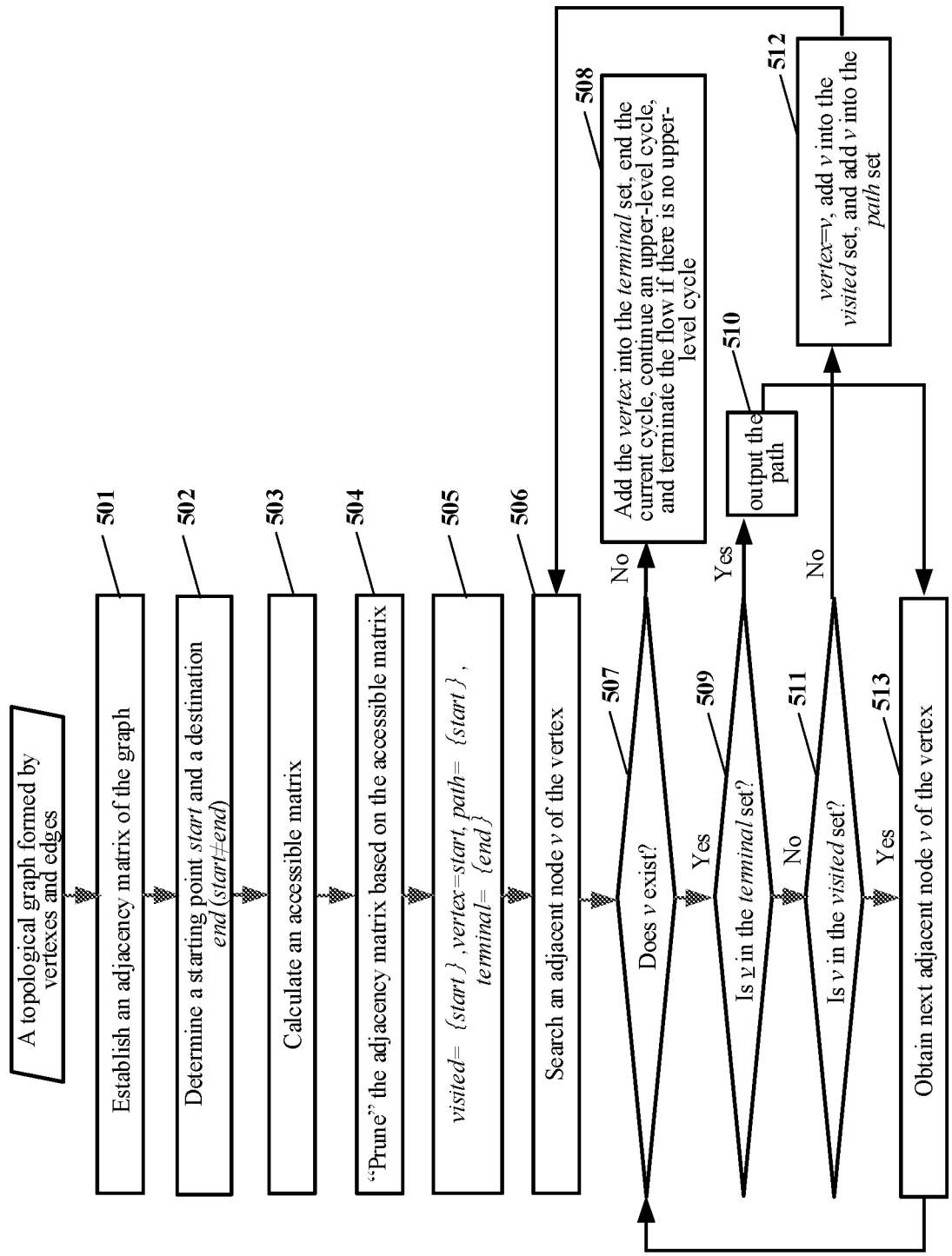
FIG. 5 schematically illustrates a flowchart of a specific example implementation for determining accessible paths between two nodes according to an embodiment of the present disclosure.

Referring to FIG. 5, first, for a topological graph including vertices and edges, an adjacency matrix of the graph is established (step 501). Specifically, as described in FIG. 2A and FIG. 2B, an N×N matrix is established, where N is equal to the number of nodes in the graph. For the $i^{th}$ row and $j^{th}$ column in the adjacency matrix, the corresponding weight is set according to whether there is a direct path from node i to node j. If there is a direct path from node i to node j, the weight is set to a value greater than 0, such as 1; if there is no direct path from node i to node j, the weight is set to 0. In this way, the adjacency matrix of the topological graph as shown in FIG. 2B can be formed.

Next, in step 502, a search target is determined, that is, an accessible path from which node to which node to be sought for is determined. In other words, a starting node (namely, a starting node) start and an ending node (namely, a destination) end of the search are determined. Meanwhile, a condition may be further set to ensure the starting node is different from the destination because search is unnecessary in this case.

Then, in step 503, the accessible matrix may be calculated based on the adjacency matrix. Specifically, as shown in FIG. 3A and FIG. 3B, the adjacency matrix is first represented with a matrix P, and then the K-order adjacency matrices of the matrix P is calculated, where K=1, . . . N−1. Then, the accessible matrix A is calculated according to the above Equation 1 based on the K-order adjacency matrices of the matrix P, as shown in FIG. 3B.

In the next step 504, pruning or reducing the adjacency matrix can be performed based on the accessible matrix. As stated above, nodes that cannot reach the destination are determined according to the accessible matrix shown in FIG. 3B. For example, in the case where the destination is node 7, it may be determined based on the 7th column of the accessible matrix A that only node 4 and node 5 cannot reach the destination 7. Based on such determination, rows and columns related to node 4 and node 5 may be removed from the adjacency matrix correspondingly.

Then, in step 505, initialized setting of parameters is performed before searching. Three sets are provided: one is a visited node set visited in which already-visited nodes are stored; the second set is a path set path in which path already found from the search are stored; the third set is a termination condition set terminal in which nodes serving as the termination conditions are stored. In addition, there is further a vertex variable vertex, which indicates a vertex for which adjacent node search is being performed. Upon initial setting, the set visited is set as {start}, which only includes the starting node because search will be performed for it next; the vertex node is also set as start, because an adjacent node will be sought for the start node next; the set path is set as only including {start}; the set terminal is set as only including a destination, i.e., only the destination is the termination condition, because initially, search is not yet started, and an additional termination condition cannot be added.

Next, in step 506, an adjacent node v is sought for the vertex. Upon the first search, vertex is set as a starting node, so search is performed with respect to the starting node. Then, in step 507, determination is made as to whether there is the adjacent node v of the vertex.

If it is determined that there is the adjacent node v of the vertex in step 507, judgment is further performed in step 509 as to whether the adjacent node v is a node in the termination condition set terminal. If NO, judgment is further performed as to whether the adjacent node v is in the set visited; if YES, next adjacent node v of the vertex is sought for in step 513, and then the operation returns to step 507 to continue the next cycle.

On the other hand, if it is determined at step 507 that there is not any adjacent node v of the vertex, the vertex is added into the set terminal in step 508, and the search of the current cycle is ended, and the flow returns to a upper-level cycle. If there is no an upper-level cycle, all searches will be ended. If it is determined at step 509 that the found adjacent node v of the vertex is a node in the termination condition set, search will not be performed for an adjacent node of the adjacent node v any more, and instead, an already-sought path corresponding to the adjacent node v will be output in step 510, and the flow will turn to step 513 to begin to search for next node of the vertex. If it is judged in step 511 that the found adjacent node v is not in the visited node set visited, in step 512 the found adjacent node v is set as a new vertex, and the adjacent node v is added to the set visited and the path set path, and then an adjacent node of the new vertex is sought for.

It can be seen that from the specific implementation shown in FIG. 5 that in the above search process, after an adjacent node of a vertex is found from the search, search will be continued in the depth direction for the adjacent node. Other adjacent nodes of the vertex will be sought for only after all searches for the adjacent node are completed. Hence, such search is a search based on a depth-first traversal. However, it is to be appreciated that the solution of the present invention may also be applied to other manners of searches, such as breadth-first traversal. In addition, the implementation presented in the flow chart is only an example of the solution proposed in the present disclosure. Upon actual implementation, various modifications may be made thereto.

Figure 6A:
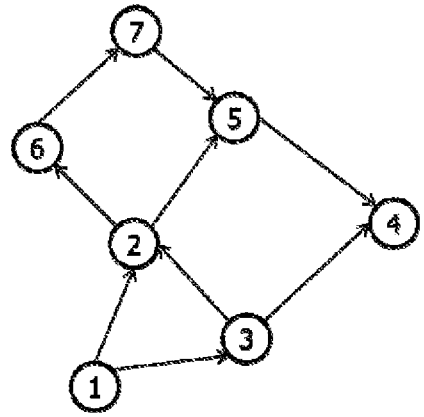
FIG. 6A and FIG. 6B schematically illustrate a schematic diagram of a search process based on deep traversal according to the prior art and a schematic diagram of a search process based on deep traversal according to the present disclosure.
Figure 6B:
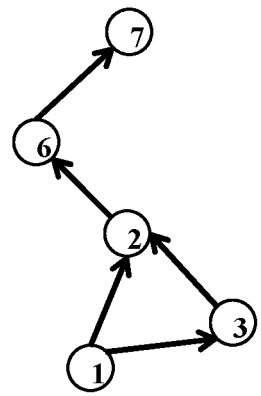

To demonstrate the difference between the solution of the present invention and the solutions in the prior art, FIG. 6A and FIG. 6B further illustrate a schematic diagram of a search process based on deep traversal according to the prior art and a schematic diagram of a search process based on deep traversal according to the present disclosure.

As shown in FIG. 6A, according to the prior art, for the case of determining the accessible path from node 1 to node 7, the search is carried out from node 1 first, and after the adjacent node 2 of node 1 is found from the search, continue to search for the adjacent node of node 2, and the adjacent node 5 of node 2 is found from the search, continue to search for an adjacent node of node 5, and then after an adjacent node 4 of the node 5 is found from the search, search for an adjacent node of the adjacent node 4. It is found that the node does not have an adjacent node and the node 4 is not a destination. At this time, a path 1: 1→1 2→1 2 5→1 2 5 4 is found from the search, but path 1 is not an accessible path from node 1 to node 7. The, the flow returns to a upper-level node of the node 4, namely, node 5, then other adjacent nodes of node 5 is sought for, whereupon there are no other adjacent nodes, then continue to return to a upper-level node of node 5, namely, node 2. Then, other adjacent nodes of node 2 are sought for. At this time, it is found from the search that node 2 has another adjacent node 6, then the adjacent node 6 is taken as a new vertex, and the adjacent point of node 6 is sought for. At this time, the adjacent node 7 of the node 6 is found from the search. The node 7 is a destination. Therefore, at this time, the found path 2 is: 1→1 2→1 2 6→1 2 6 7, and it is an accessible path from node 1 to node 7. Similarly, return to an upper-level node of node 7, namely, node 6, to continue to search for an adjacent node of node 6. If it is found that there is no any adjacent node, then continue to return to the upper-level node, namely, node 2, to search for other adjacent nodes of node 2. It is found by searching for the adjacent nodes of node 2 that there are no other adjacent nodes other than node 5 and node 6. At this time, continue to return to the upper-level node, node 1, and search for other adjacent nodes of node 2 with respect to node 1.

It will be found from the further search for the adjacent point of node 1 that node 1 further has another adjacent node 3. Like node 2, search for the adjacent point of node 3 is executed. At this time, the following three paths will be traversed: namely, path 3: 1→1 3→1 3 2→1 3 2 5→1 3 2 5 4; path 4: 1→1 3→1 3 2→1 3 2 6→1 3 2 6 7; path 5: 1→1 3→1 3 4. Among the three paths, only path 4 (namely, 1 3 2 6 7) is an accessible path from node 1 to node 7.

It can be seen from the search process in FIG. 6A that in the case of the prior art, repeated traversal for 2 5 4 exist in path 1 and path 3, and traversal for 2 6 7 exists in path 2 and path 4. In addition, path 1, path 3 and path 5 are all invalid traversals where no accessible path is found. Therefore, the search takes a long time and the search efficiency is low.

FIG. 6B shows a schematic diagram of a search process based on depth traversal according to the present disclosure. In FIG. 6B, the topological graph has been pruned using the accessible matrix according to the proposal in the present disclosure, so only nodes 1, 2, 3, 6, and 7 are left in the reduced accessible matrix. In this case, as for the case of determining the accessible paths from node 1 to node 7, search is first performed from node 1; after the adjacent node 2 of the node 1 is found, continue to search for an adjacent node of node 2; after the adjacent node 6 of node 2 is found; continue to search for an adjacent node of node 6; then the adjacent node 7 of node 6 is found from the search. The node 7 is a destination, so the search terminates. The path 1: 1→1 2→1 2 6→1 2 6 7 is obtained, and the path 1 is the accessible path from node 1 to node 7. Next, return the upper-level node from node 7 level by level, search for other adjacent points of nodes 6, 2, and find no other adjacent points. After the search for nodes 6 and 2 is completed, both node 6 and node 2 may be placed in the termination condition set. Finally, after it is found that node 2 does not have any other adjacent points, the search will return from node 2 to the upper-level node, namely node 1. Then, search for next adjacent node of node 1, and find node 3 at this time, then continue to search for next adjacent node of node 3, and find node 2 at this time. Then, it is found that node 2 is already in the termination condition set. Hence, the search terminates, and the previously-traversed accessible path "2 6 7" is returned as a search result for node 2, and finally the accessible path 1→1 3→1 3 2→1 3 2 6 7 is obtained. The search continues to return to the previous level to search for other adjacent node v of the node 3, and the result shows that there are no any other adjacent nodes. At this point, node 3 may be added to the termination condition set, and the search further returns to the level of node 1 to search for other nodes of node 1. In this moment, it is found there are no any other adjacent nodes. Hence, the search for the accessible path from node 1 to node 7 is completed.

It can be seen from the search process shown in FIG. 6A and FIG. 6B that in the solution of determining accessible paths from two nodes according to the present disclosure, since the network and the adjacency matrix are pruned in advance, there is no search for invalid paths in the search process of 6B. At the same time, because additional termination conditions are set based on the search process, the search for the second path 1 3 2 6 7 will be terminated when this search reaches node 2, and the path 2 6 7 of the previous search will be directly reused. Therefore, compared with the search process in the prior art, even for such a simple network, repeated traversals can be reduced, the time required to search for the accessible paths between two nodes can be significantly reduced, and the efficiency of searching for the accessible paths can be significantly improved. Therefore, for other more complicated applications, the effects of reducing repetitive traversal, shortening search time and improving search efficiency will be more significant.

Figure 7:
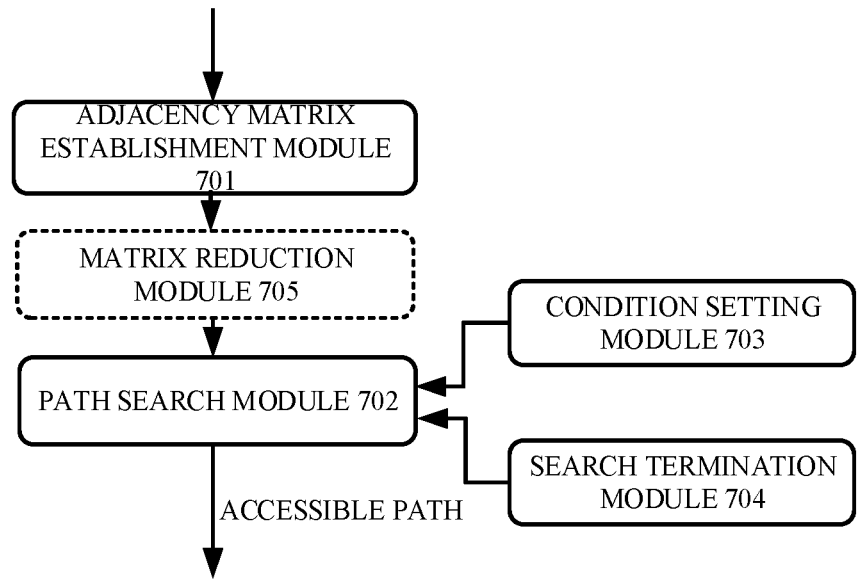
FIG. 7 schematically illustrates a block diagram for an apparatus for determining accessible paths between two nodes according to an embodiment of the present disclosure.

FIG. 7 schematically illustrates a block diagram for an apparatus 700 for determining accessible paths between two nodes according to an embodiment of the present disclosure. As shown in FIG. 7, the apparatus 700 may include: an adjacency matrix establishment module 701, a path search module 702, a condition setting module 703 and a search termination module 704. The adjacency matrix establishment module 701 may be configured to establish an adjacency matrix of a graph including a plurality of points and edges connecting the plurality of points. The path search module 702 may be configured to search for an accessible path that can reach a destination from a starting point based on the adjacency matrix. The condition setting module 703 may be configured to set a termination condition for the searching based on an already-sought path during the searching. The search termination module 704 may be configured to terminate the corresponding search in response to the termination condition being met during the searching.

In an embodiment according to the present disclosure, the example apparatus 700 may further include a matrix reduction module 705 which may be configured to reduce the adjacency matrix before the searching, to reduce the search space, wherein the searching is performed based on the reduced adjacency matrix.

In another embodiment according to the present disclosure, the matrix reduction module 705 may be further configured to: determine an accessible matrix of the graph according to the adjacency matrix; and reduce the adjacent matrix according to the accessible matrix and the destination.

In another embodiment according to the present disclosure, the matrix reduction module 705 may be further configured to: determine 2-order to N-1-order adjacency matrixes of the graph according to the adjacency matrix, where N is the number of nodes in the graph, and add up the adjacency matrix and the 2-order to N-1-order adjacency matrixes to determine the accessible matrix of the graph.

In still another embodiment according to the present disclosure, the matrix reduction module 705 may be further configured to determine nodes that cannot reach the destination in the accessible matrix; and remove the nodes that cannot reach the destination from the adjacency matrix to form a reduced adjacency matrix.

In another embodiment according to the present disclosure, the condition setting module 703 may be further configured to: monitor the searching and set a node as one of the termination conditions for the searching when the search process has already traversed all paths from the node to the destination.

In an embodiment according to the present disclosure, the search termination module 704 may be configured to terminate the corresponding search when a node for which an adjacent node search is to be performed is not the destination, and take a previous search result corresponding to the node as the search result for the node.

In another embodiment according to the present disclosure, the search termination module 704 may be configured to terminate the corresponding search when a node for which an adjacent node search is to be performed is the destination, output an accessible path from the starting point to the destination already found from the searching, and return to search for an upper-level node.

In another embodiment according to the present disclosure, the path search module 702 is further configured to search based on depth-first traversal.

It should be noted that each module in the apparatus 700 described above with reference to FIG. 7 may be configured to perform operations corresponding to the method described with reference to FIG. 1 through FIG. 6. Therefore, the specific operations of the modules of the apparatus 700 are not described in detail here. For details of the specific operations of these modules, reference may be made to the depictions of the respective steps of the corresponding method with reference to FIG. 1 through FIG. 6.

Figure 8:
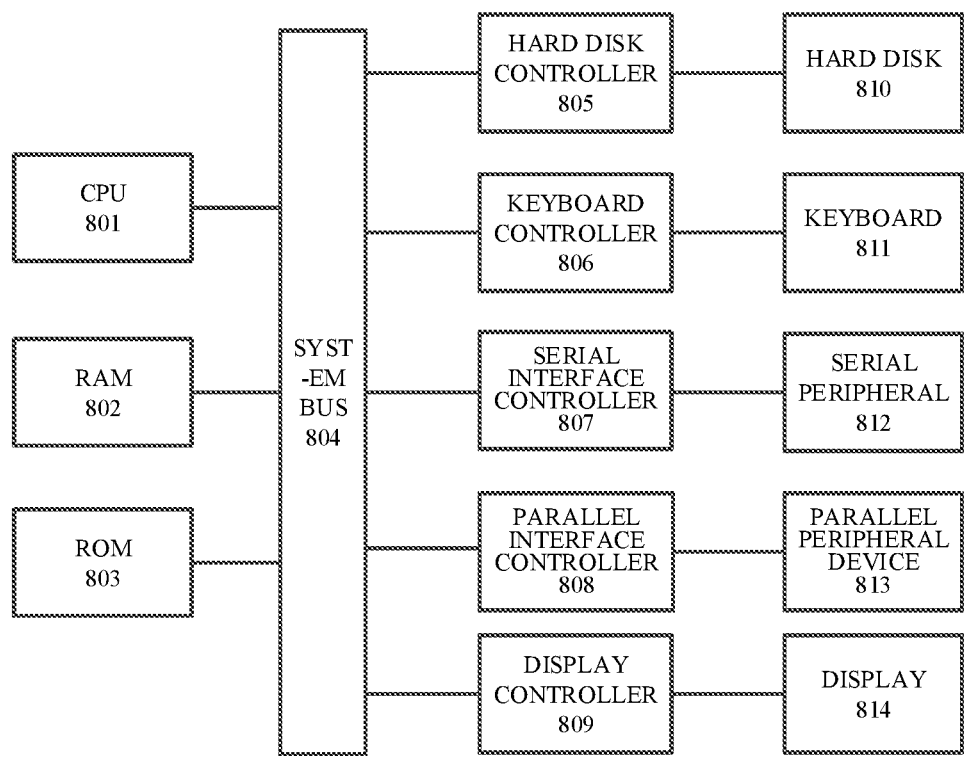
FIG. 8 schematically illustrates a schematic diagram of a system for determining accessible paths between two nodes according to an embodiment of the present disclosure.

FIG. 8 schematically illustrates a schematic diagram of a system for determining accessible paths between two nodes according to an embodiment of the present disclosure. Next, reference will be made to FIG. 8 to describe a system for determining accessible paths between two nodes A computer system illustrated in FIG. 8 comprises CPU (Central Processing Unit) 801, RAM (Random Access Memory) 802, ROM (Read-Only Memory) 803, system bus 804, hard disk controller 805, keyboard controller 806, serial interface controller 807, parallel interface controller 808, display controller 809, hard disk 810, keyboard 811, serial peripheral device 812, parallel peripheral device 813 and display 814. Among these components, the system bus 804 is connected with CPU 801, RAM 802, ROM 803, hard disk controller 805, keyboard controller 806, serial interface controller 807, parallel interface controller 808 and display controller 809. The hard disk 810 is connected with the hard disk controller 805; the keyboard 811 is connected with the keyboard controller 806; the serial peripheral device 812 is connected with the serial interface controller 807; the parallel peripheral device 813 is connected with the parallel interface controller 808; and the display 814 is connected with the display controller 809.

The memory can be stored with one or more codes which, when being executed by the computer, causes the CPU to perform steps of the method proposed in the embodiments of the present disclosure, such as those embodiments described with reference to FIGS. 1 to 6 hereinabove.

It should be appreciated that the structural block diagram of FIG. 8 is presented for illustrative purposes and does not limit the present invention in any way. In some cases, some devices therein can be added or reduced as required.

It can be understood that the solution provided in the present disclosure can be applied in various applications, such as pharmaceuticals, manufacturing, market analysis, traffic forecast, weather forecast, air quality forecast and the like, to acquire advantageous effects.

Moreover, embodiments of the present invention can be fulfilled by software, hardware of combinations of software and hardware. The hardware portion can be implemented by dedicated logic; the software portion can be stored in a memory and executed by a suitable instruction execution system, such as microprocessor or dedicated design hardware.

The ordinary skilled in the art can understand that the above method and apparatus can be realized using computer-executable instructions and/or can be performed in the processor control codes, e.g., codes provided on disks, carrier media of CD or DVD-ROM, programmable memory of read-only memory (firmware) or data carriers of optical or electronic signals.

The apparatus and its components of the implementation can be implemented, for example, by super large-scale integrated circuits or gate arrays, semiconductors (such as logic chips, transistors and the like), or hardware circuits of programmable hardware devices (such as field programmable gate arrays, programmable logic devices and the like), and also can be implemented by a variety of software executed by the processor or by a combination of the above hardware circuits and software, such as firmware.

Although the present invention has been described with reference to the currently conceived embodiments, it should be appreciated that the present invention is not limited to the embodiments disclosed herein. Instead, the present invention is intended to encompass various modifications and equivalent arrangements included within spirit and scope of the attached claims. The scope of the attached claims complies with the widest interpretation to contain all such modifications and functions of equivalent structures.

We claim:

1. A method for determining accessible paths between two nodes, comprising:
    establishing an adjacency matrix of a graph including a plurality of points and edges connecting the plurality of points;
    searching for an accessible path that can reach a destination from a starting point based on the adjacency matrix; and,
    reducing the adjacency matrix before performing the searching, to reduce the search space, wherein the searching is performed based on the reduced adjacency matrix,
    wherein a termination condition for the searching is set based on an already-sought path during the searching, and a corresponding searching is terminated in response to the termination condition being met during the searching,
wherein the reducing the adjacency matrix comprises:
  determining an accessible matrix of the graph according to the adjacency matrix; and
  reducing the adjacent matrix according to the accessible matrix and the destination and
wherein the determining an accessible matrix of the graph according to the adjacency matrix comprises:
  determining 2-order to N−1-order adjacency matrixes of the graph according to the adjacency matrix, where N denotes the number of nodes in the graph, and
  adding up the adjacency matrix and the 2-order to N−1-order adjacency matrixes to determine the accessible matrix of the graph.

2. The method according to claim 1, wherein the reducing the adjacent matrix according to the accessible matrix and the destination comprises:
  determining nodes that cannot reach the destination in the accessible matrix; and
  removing the nodes that cannot reach the destination from the adjacency matrix to form a reduced adjacency matrix.

3. The method according to claim 1, wherein the setting termination condition for the searching based on an already-sought path comprises:
  monitoring the searching, and
  setting a node as one of the termination conditions for the searching when the searching has already traversed all paths from the node to the destination.

4. The method according to claim 1, wherein the terminating the corresponding search in response to the termination condition being met during the searching comprises:
  terminating the corresponding search when a node for which an adjacent node search is to be performed is not the destination, and taking a previous search result corresponding to the node as the search result for the node.

5. The method according to claim 1, wherein the terminating the corresponding search in response to the termination condition being met during the searching comprises:
  terminating the corresponding search when a node for which an adjacent node search is to be performed is the destination, outputting an accessible path from the starting point to the destination already found from the searching, and returning to search for an upper-level node.

6. The method according to claim 1, wherein the searching for an accessible path that can reach a destination from a starting point is a search based on depth-first traversal.

7. A system for determining accessible paths between two nodes, comprising:
  a processor; and
  a memory having computer program codes stored therein which, when executed by the processor, causing the processor to perform the method according to claim 1.

8. A computer-readable storage medium having computer program codes stored thereon, the computer program codes, when executed by a processor, causing the processor to perform the method according to claim 1.

9. An apparatus for determining accessible paths between two nodes, comprising:
  a memory storing instructions; and
  at least one hardware processor configured to execute the instructions to implement:
    establishing an adjacency matrix of a graph including a plurality of points and edges connecting the plurality of points;
    searching for an accessible path that can reach a destination from a starting point based on the adjacency matrix;
    setting a termination condition for the searching based on an already-sought path during the searching;
    terminating a corresponding searching in response to the termination condition being met during the searching;
    reducing the adjacency matrix before the searching, to reduce the search space, wherein the searching is performed based on the reduced adjacency matrix;
    determining an accessible matrix of the graph according to the adjacency matrix; and reduce the adjacent matrix according to the accessible matrix and the destination;
    determining 2-order to N−1-order adjacency matrixes of the graph according to the adjacency matrix, where N is the number of nodes in the graph; and
    adding up the adjacency matrix and the 2-order to N−1-order adjacency matrixes to determine the accessible matrix of the graph.

10. The apparatus according to claim 9, wherein the at least one hardware processor is further configured to execute the instructions to implement:
  determining nodes that cannot reach the destination in the accessible matrix; and
  removing the nodes that cannot reach the destination from the adjacency matrix to form a reduced adjacency matrix.

11. The apparatus according to claim 9, wherein the at least one hardware processor is further configured to execute the instructions to implement:
  monitoring the searching, and
  setting a node as one of the termination conditions for the searching when the searching has already traversed all paths from the node to the destination.

12. The apparatus according to claim 9, wherein the at least one hardware processor is further configured to execute the instructions to implement:
  terminating the corresponding search when a node for which an adjacent node search is to be performed is not the destination, and take a previous search result corresponding to the node as the search result for the node.

13. The apparatus according to claim 9, wherein the at least one hardware processor is further configured to execute the instructions to implement:
  terminating the corresponding search when a node for which an adjacent node search is to be performed is the destination, output an accessible path from the starting point to the destination already found from the searching, and return to search for an upper-level node.

14. The apparatus according to claim 9, wherein the at least one hardware processor is further configured to execute the instructions to implement searching based on depth-first traversal.

* * * * *